(12) United States Patent
Rainer

(10) Patent No.: US 8,263,229 B1
(45) Date of Patent: Sep. 11, 2012

(54) COMPOSITE STRUCTURES FOR THE ABSORPTION OF DISSOLVED METALS

(76) Inventor: Norman B. Rainer, Richmond, VA (US)

(*) Notice: Subject to any disclaimer, the term of this patent is extended or adjusted under 35 U.S.C. 154(b) by 720 days.

(21) Appl. No.: 12/321,866

(22) Filed: Jan. 28, 2009

(51) Int. Cl.
*B32B 15/00* (2006.01)
*B32B 17/06* (2006.01)
*B32B 27/08* (2006.01)
*B32B 27/34* (2006.01)
*B01J 49/00* (2006.01)
*C08J 5/20* (2006.01)

(52) U.S. Cl. .................. 428/435; 428/474.4; 521/25

(58) Field of Classification Search .......... 428/370, 428/372, 435, 474.4, 478.2; 524/30, 36; 527/312; 525/417; 521/25
See application file for complete search history.

(56) References Cited

U.S. PATENT DOCUMENTS

| 3,715,339 | A | * | 2/1973 | Rainer | 525/417 |
| 5,096,946 | A | * | 3/1992 | Rainer | 524/30 |
| 5,897,779 | A | * | 4/1999 | Wisted et al. | 210/651 |
| 6,380,456 | B1 | * | 4/2002 | Goldman | 604/368 |

* cited by examiner

*Primary Examiner* — Noah Wiese
(74) *Attorney, Agent, or Firm* — Norman B. Rainer

(57) ABSTRACT

Irregularly shaped granules of a polymer capable of rapidly removing trace levels of toxic heavy metals from water, but posing high resistance to the flow of water, are trapped within interstitial spaces of a shape-retaining porous matrix of inter-contacting fibers, forming a composite structure useful in on-the-run water remediations. The composite structure is produced by generating the granules within the matrix.

8 Claims, 1 Drawing Sheet

COMPOSITE STRUCTURES FOR THE ABSORPTION OF DISSOLVED METALS

RELATED APPLICATIONS

This application is based upon allowed U.S. patent application Ser. No. 11/803,076, filed May 14, 2007.

BACKGROUND OF THE INVENTION

1. Field of the Invention

This invention relates to the purification of water, and more particularly concerns compositions for the selective removal of trace levels of dissolved metals from water.

2. Description of the Prior Art

Undesirable pollutant species such as dissolved toxic metals can occur regularly or periodically in natural bodies of water such as lakes, rivers, streams, groundwater and stormwater, and in industrial waters such as landfill leachate, municipal sewage systems and wastewater discharges. The toxic metals are primarily multivalent "heavy" metals, and can be caused to form insoluble compounds with anionic additives. The most prevalent technique for the removal of toxic heavy metals is to add to the water a sufficient amount of an anionic precipitating agent. The resultant precipitate is then allowed to settle or is removed by filtration or other methods.

Although precipitative techniques are effective, they require that the water undergoing remediation be accumulated in tanks and held there for considerable periods of time with agitation while the treatment agents are added and dispersed, causing the heavy metals to form precipitates of sufficiently large particle size to facilitate settling and/or filtration. Operations of this nature require large, expensive equipment installation and high operating expense. The high cost of such installations is justifiable only where extremely large volumes of water must be treated on a long term basis, such as in municipal waste water treatment facilities and operations involving large industrial facilities.

Another general technique for removing dissolved metal species from water involves the passage of a stream of the water undergoing remediation through a substantially stationary, water permeable bed of absorbent material. Suitable absorbent materials for such on-the-run treatments include ion exchange resins having affinity for species in either cationic or anionic form. The advantage of such technique is that the water can be treated while flowing through a confined bed of the resins, thereby avoiding the need for large holding and processing tanks.

Ion exchange resins are generally in the form of spherical beads having been made by catalyzed suspension polymerization of a liquid styrene/divinylbenzene prepolymer mixture. By virtue of controlled conditions of mixing and use of surfactants, the prepolymer is suspended as discrete spherical droplets within an engulfing continuous phase aqueous medium. The resultant polymer product is in the form of spherical beads having a size generally in the range of 16 to 50 mesh (U.S. Sieve Series), or 1.2 mm to 0.3 mm, respectively. The beads are then subjected to chemical treatments which impart specific ion exchange functionality. Because of their bead form and relatively large diameter, beds of ion exchange resins in vertically oriented columns or tanks offer relatively little impedance to the flow of water through the bed.

Other specialized absorbents for the removal of trace pollutants from water are available, in the form of irregularly shaped granules, the most notable example being granular activated carbon. When comparing absorbents in bead form with absorbents in granule form at the same particle size, beds of granular form absorbents produce higher flow impedance. Even higher flow impedance is encountered when the granules are comprised of water swollen soft polymer, usually referred to as hydrogel polymer and containing between 30% and 70% by weight of water. Examples of the use of hydrogel granules for the selective removal of trace heavy metals from water are disclosed in U.S. Pat. Nos. 7,041,222; 3,715,339 and elsewhere. The expression "trace heavy metals" as used herein is intended to denote waters having less than 50 parts per million (ppm) of a targeted metal ion.

The aforesaid hydrogel polymer is generally produced by the thermal condensation polymerization of an aqueous prepolymer solution. The resultant polymer is produced as irregularly shaped granules in the size range of 10 to 80 mesh (U.S. Sieve Series). Although the granules, when employed as an absorption bed, cause high impedance to the flow of water through the bed, they possess two valuable characteristics, namely: 1) a degree of selectivity that permits removal of specific toxic heavy metals in the midst of hundred-fold greater concentrations of commonly abundant innocuous species, and 2) extremely high kinetics, namely the ability to remove selective species at 90% efficiency within contact times less than one minute.

Allowed U.S. patent application Ser. No. 11/803,076, filed May 14, 2007 discloses the blending of metal-absorbing hydrogel granules with spacer particles to produce a composition which, when confined as a bed within a conduit through which water flows, provides little impedance to the flow of water and resists fouling by accumulation of suspended particles in the water undergoing treatment. Said compositions, however are not shape-retaining structures. Because of this, it has been found that the spacer particles, whether of fibrous or non-fibrous configuration, separate from the hydrogel granules by gravimetric action and differential flotative effects. Difficulties are also encountered in emplacing said compositions within a conduit to form a bed of uniform consistency.

It is accordingly an object of the present invention to diminish the impedance to flow of beds of polymeric absorbent in granular form used for removing dissolved metal species from water flowing through said bed.

It is another object of this invention to dispose metal-absorbing granules within a porous shape-retaining structure which provides low resistance to the flow of water therethrough.

It is a further object of the present invention to provide a shape-retaining structure of the aforesaid nature confining metal-absorbing granules and which is easily emplaced within a water-carrying conduit.

It is a still further object of this invention to provide a process for producing the aforesaid shape-retaining structure having confined granules for the absorption of dissolved metals.

These objects and other objects and advantages of the invention will be apparent from the following description.

SUMMARY OF THE INVENTION

The above and other beneficial objects and advantages are accomplished in accordance with the present invention by a composite shape-retaining structure comprised of a matrix of randomly arranged intercontacting fibers bonded together at their intercontacting sites, thereby defining communicating interstitial spaces, said spaces confining granules of a polymer having selective affinity for dissolved heavy metals.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENTS

Figure 1:
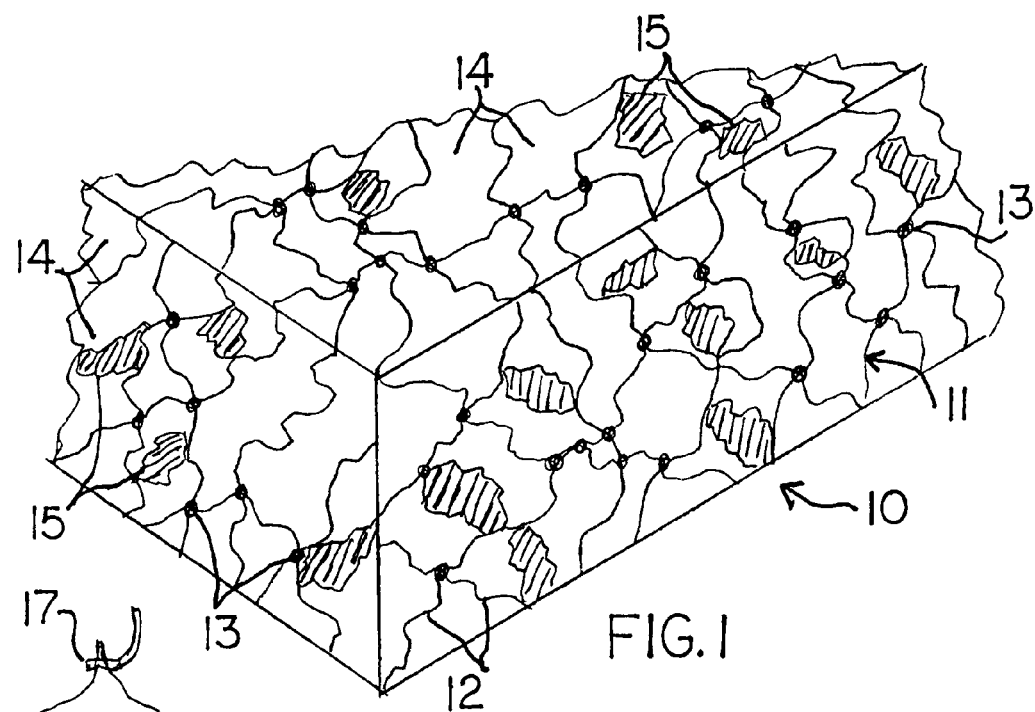
FIG. 1 is a greatly enlarged fragmentary schematic view of an embodiment of the composite structure of the present invention.

Referring now to FIG. 1, an embodiment of the composite structure 10 of the present invention is shown comprised of a three-dimensional matrix 11 consisting of a random array of intercontacting fine denier fibers 12 which are bonded together at their sites of contact 13. Interstitial spaces 14 are thereby produced which communicate with contiguous spaces. Irregularly spaced granules of polymer 15 are physically trapped within many of said spaces.

The fibers 12 which constitute matrix 11 are selected to resist physical deformation at temperatures up to 350° F. Suitable thermally resistant fibers include polyester, and vitreous inorganic fibers such as fiberglass, rock wool and slag wool. Said fibers are preferably melt spun continuous filament fibers.

Suitable matrix structures, when fabricated of polyester fiber, are generally referred to as "batts" or "batting". The manufacture of such batting, as described in U.S. Pat. Nos. 5,532,050; 5,225,242 and elsewhere, generally involves polyester filaments of 1.0 to 25 denier per filament, which are interbonded by means of acrylic polymers or other agents. The resultant bonded batting generally has a basis weight of 1.5 to 12 ounces/square yard, and a uniform thickness in the range of 0.5 to 2.5 inches. Such battings are compliant but shape-retaining.

Other suitable matrix structures include panels comprised of randomly arranged vitreous fibers such as fiberglass, rock wool and slag wool, and consolidated by bonding agents such as phenolic resins that maintain the integrity of the panel. The density and rigidity of the panels are dependent upon the degree of compaction of the fibers and the amount of bonding agent employed. Typical suitable panels are described in U.S. Pat. Nos. 5,866,486 and 7,459,490. Rock wool panels are available in thicknesses of 1 to 3 inches and at densities of 5-10 pounds per cubic foot, having compressive modulus of 1 to 4 lbs/cm$^2$ at 10% compression.

The metal-absorbing polymer component of the structure of the present invention is preferably produced by the thermal treatment of a mixture of prepolymer or monomer components. Said mixture is preferably a homogenous aqueous solution of said prepolymer components. The polymer thereby produced is generally considered to be a "condensation" polymer, as distinguished from "addition" polymers which are not produced by heating but instead are formed by the catalyzed joining of monomeric precursors.

The polymer component of this invention further requires a chemical functionality which enables it to selectively absorb certain dissolved multivalent toxic heavy metal ions amidst a vastly greater concentration of innocuous species. Such specialized functionality enables the polymer to remove trace levels of toxic metal species from stormwater, groundwater and other natural and industrial flows of water. The expression "selective affinity", as employed herein is intended to denote the ability of a polymer to absorb targeted heavy metals amidst at least a hundred fold higher concentration of other dissolved species. As employed herein, the expression "heavy metals" is intended to denote dissolved ionized forms of metals in groups 1B through 8B of the periodic table of the elements. In order to be useful in its intended applications, the polymer component must be capable of holding at least 3% by weight of the targeted metal at saturation of the polymer component (dry weight basis).

A particularly preferred polymer, described in U.S. Pat. No. 5,096,946, is produced by initially forming an aqueous solution of a polyfunctional amine such as polyethyleneimine, and a polyfunctional carboxylic acid such as nitrilotriacetic acid, then heating the solution to drive off the water, and continuing heating to curing temperatures of 280° F. to 350° F. to produce a polyamide polymer. The cured polymer is no longer soluble in water. However, when contacted by water, the polymer swells with decrepitation to form water-swollen hydrogel granules of irregular size and shape. The hydrogel granules contain 30% to 70% water. Such polymer selectively absorbs heavy metal species by way of chelation and complexation mechanisms. Furthermore, the polymer exhibits extremely fast kinetics. For example, when deployed in granular form as a bed in a column through which water is caused to flow, 95+% removal of trace heavy metals can be removed within contact times of less than one minute. Such results are reported in: "Removal of Trace Concentrations of Heavy Metals Using Complexing Ion-Exchange Resins" by Paul Taylor, Oak Ridge National Laboratory, 14th Symposium on Separation Science and Technology, Oct. 24-27, 2005, and reproduced in www.dynaphore.com, said report being incorporated herein by reference. Alternative suitable polymers can be produced from prepolymer solutions comprised of various polyfunctional amines and polyfunctional carboxylic acids. Addition polymers are also contemplated, particularly when one of the monomeric ingredients contains amine groups.

The preferred method for producing the composite structure of the present invention is to impregnate a suitable matrix substrate of bonded fibers with an aqueous precursor solution of a suitable thermally curable polymer. The impregnated substrate is then heated to drive off the water of solution. At this point the substrate can be shaped if necessary to a desired configuration. The substrate is then heated at temperatures in the range of 270° F. to 350° F. to accomplish polymerization of the prepolymer ingredients.

The duration of heating is dependent upon the physical size and configuration of the impregnated substrate, and can be from about 1 to 6 hours. The resultant structure, containing internally generated polymer, is of greater rigidity than the starting substrate. This facilitates installation into a conduit, whether of circular or rectangular cross-section adapted to direct water through the substrate. As initially produced, the in-situ generated polymer is attached to the fibers of the matrix substrate. However, when the composite structure is contacted by water, the polymer automatically undergoes decrepitation to form water-swollen granules that become entrapped within the interstitial spaces between the fibers of the matrix.

In an alternative process, the composite structure of this invention can be produced by forming a dispersion of granules of a suitable polymer, and applying such dispersion to an appropriate shape-retaining fibrous matrix.

A further understanding of my invention will be had from a consideration of the following examples which illustrate certain preferred embodiments. It is to be understood that the instant invention is not to be construed as being limited by said examples or by the details therein.

Example 1

Figure 2:
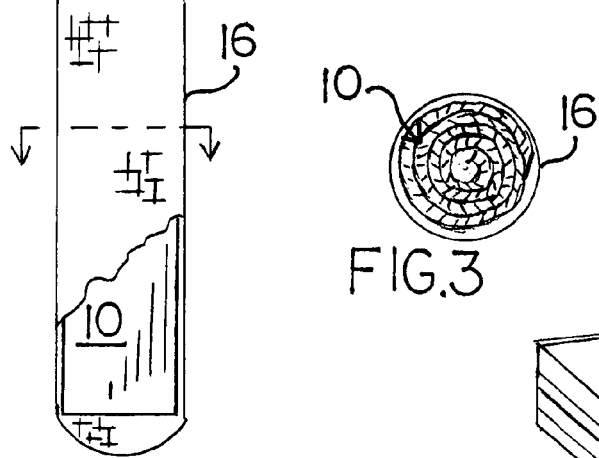
FIG. 2 is a side view of a circular cylindrical embodiment of the structure of FIG. 1, with portions broken away.
Figure 3:
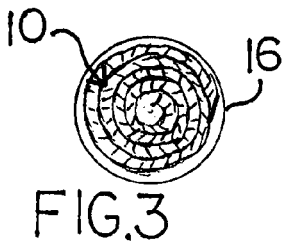
FIG. 3 is an enlarged sectional view taken in the direction of the arrows upon line 3-3 of FIG. 2.

A roll of resin bonded polyester batting was obtained from Batt-Mart of Rogersville, Ala. The batting has a thickness of 1" and a density of 4.7 ounces per square yard. A length of said batting was cut to measure 22" by 66". Said length was spray treated with an aqueous prepolymer solution containing 78 grams polyethyleneimine and 76 grams nitrilotriacetic acid. The spray-treated length was spirally wound in its long direction to form a cylindrical roll having an axial length of 22", and a diameter of 4", shown in FIGS. 2 and 3 as item 10.

The treated roll was placed in an air-circulating oven and heated at 320° F. for five hours. The roll, now rigid by virtue of a 96% add-on content of cured polymer, was inserted into a close-fitting tubular bag 16 of nylon tricot fabric configured to undergo significant diametric expansion with little axial elongation. A drawstring 17 provides adjustable closure of the top of the bag. The function of the bag is to catch and retain any granular material that escapes from the roll, and to simplify insertion into a cylindrical conduit. The mesh size of the tricot fabric is comparable to 80 mesh (U.S. Sieve Series). Preferable mesh sizes are in the range of 40-100 mesh.

The bag with its confined roll of treated batting was easily inserted into a vertically oriented acrylic column of 4" diameter and 5 foot height. A flow of tap water was run through the bag/roll assembly retained within the column. The initial action of the water is to cause the polymer to self-granulate with concomitant production of water-swollen granules of about 10×80 mesh size that become trapped within the fiber matrix. Such factors produce a lateral swelling that produces a very tight fit of the bag with the inside wall of the column. The swelling effect is highly desirable for the purpose of eliminating any by-pass zone between the bag and the column. It has been found that, whereas polymer add-ons greater than 50% are needed to achieve the desired swelling effect, add-ons greater than 200% undesirably increase the impedance to flow of water through the structure.

The volume of the bag/roll assembly is 1.13 gallons, and the drainage volume of the assembly is found to be about 0.59 gallons. Water is then run through the confined roll assembly at a controlled flow driven by a 6" hydrostatic head (0.02 psi) above the assembly. Under such conditions the flow through the column is 0.34 gals/min. Accordingly, the calculated duration of contact of the water with the granular absorbent within the confined roll is about 15 seconds, and the measured flow impedance is 0.011 psi/foot of bed depth at a superficial velocity of 3.9 gal/min/sq.ft. of entering surface. By way of comparison, a bed of granular activated carbon of 12×40 mesh size has about a ten-fold higher flow impedance, namely 0.12 psi/foot of bed depth at the same superficial velocity of flow.

A test is then run employing water containing 5 parts per million of copper, derived from copper sulfate. The water is run through the column using the aforesaid 6" hydrostatic head and consequent 15 seconds contact duration. The efficiency of removal of the copper is found to be 98%.

In a subsequent test, a 12 inch hydrostatic head was maintained above the confined assembly, said hydrostatic head being typical of an unpumped, gravity flow stormwater treatment. The resultant contact time is 11 seconds, producing an efficiency of copper removal of 91%.

Example 2

Figure 4:
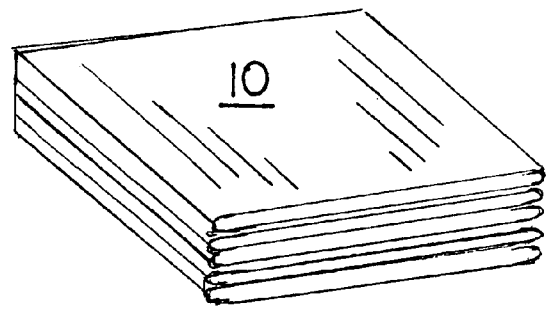
FIG. 4 is a perspective top and side view of a flat, stacked embodiment of the structure of this invention.

A fresh piece of the polyester batting of Example 1 measuring 22" by 115" was treated with an amount of the prepolymer solution of Example 1 to produce a 135% add-on of polymer. The treated batting was then accordion folded to produce a 5-fold stack of 22" square perimeter, as shown in FIG. 4. The stack was confined between upper and lower screens, and oven-treated at 285° F. for 6 hours.

The resultant cured structure with associated screens was placed vertically within a close-fitting frame in a curbside stormwater receiving receptacle. The stormwater entering and exiting the receptacle was monitored for a three month period. The entering water had an average zinc concentration of 2.2 parts per million (ppm) and a suspended solids content averaging 200 ppm. The average zinc concentration in the exiting water was 0.3 ppm, representing a reduction of 86%, and meeting requirements for the State of California.

Example 3

A bonded rock wool panel of uniform 1.5 inch thickness, having a 12" square perimeter, a bulk density of 1.7 lbs/cu.ft. and a compressive modulus of 1.2 pounds/cm$^2$ was vacuum impregnated with an aqueous prepolymer solution containing 9 parts by weight of polyethyleneimine, 16 parts by weight of nitrilotriacetic acid and 7 parts by weight of triethylenetetramine.

The impregnated panel was oven-treated at 330° F. for four hours. The resulting panel has a polymer add-on of 116% and a compressive modulus of 4.5 pounds/cm$^2$. The panel was then washed by immersion in water to remove any residual prepolymer. Upon drying, the compressive modulus is found to be 3.3 pounds/cm$^2$. The variation in the compressive modulus of the panel is explainable by the fact that the initial deposition of polymer within the fiber matrix provides a strengthening effect. Upon contact with water, the initially deposited polymer decrepitates to form granules that become entrapped within the spaces between the fibers. This results in diminished structural reinforcement yet provides an amount of compressive strength greater than the untreated starting panel.

The rock wool panel as treated hereinabove was installed horizontally in the bottom of a rectangular box conduit employed for the gravity flow treatment of industrial wastewater containing 0.8 ppm Hg, 1.1 ppm Cd, and 1.9 ppm Pb. Based upon an average contact time of 46 seconds, the resultant effluent water was found to have 97% less Hg; 94% less Cd, and 96% less Pb.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A composite shape-retaining structure comprised of a batting of randomly arranged intercontacting polyester fibers bonded together at their intercontacting sites, thereby defining communicating interstitial spaces, said spaces confining granules of a polymer having selective affinity for dissolved heavy metals, said batting having a uniform thickness in the range of about 0.5 to 2.5 inches and a basis weight of 1.5 to 12 ounces/square yard.

2. The structure of claim 1 wherein said polymer is a condensation polymer thermally produced from an aqueous prepolymer solution containing a polyfunctional amine and polyfunctional carboxylic acid.

3. The structure of claim 1 wherein said granules are irregularly shaped and capable of swelling in water so as to take on a water content of 30% to 70% by weight.

4. The structure of claim 1 wherein said polymer is capable of absorbing at least 3% of dissolved multivalent heavy metal ions based upon the dry weight of said polymer.

5. The structure of claim 1 wherein said polymer is a polyamide.

6. The structure of claim 1 in the form of a sheet spirally wound to produce a circular cylindrical unit.

7. The structure of claim 1 in the form of a sheet which is accordion folded to produce a stack having a rectangular configuration.

8. The shape-retaining structure of claim 1 wherein said granules are in the size range of 10 to 80 mesh (U.S. Sieve Series).

* * * * *